2,868,757
Patented Jan. 13, 1959

2,868,757

PROCESS OF INCORPORATING COLLOIDAL CARBON IN POLYCAPROAMIDE

Norman Kendall Jelinger Symons, Wilmington, Del., assignor to E. I. du Pont de Nemours and Company, Wilmington, Del., a corporation of Delaware No Drawing. Application July 21, 1954
Serial No. 444,911

2 Claims. (Cl. 260—37)

This invention relates to synthetic linear polycarbonamide compositions containing especially well-dispersed finely divided carbon, to fluid aqueous dispersions containing finely-divided carbon and a polycarbonamide-forming substance, and to processes for preparing these compositions. The invention is especially concerned with the preparation of weather-resistant polycarbonamide compositions.

That the weather resistance of polymeric materials may be enhanced by incorporating finely-divided carbon in them has been known for some time, the theory being that the carbon particles protect the polymer by shielding it from the harmful effects of ultraviolet light. Hitherto, however, exploitation of this principle with polycarbonamides has been hampered by the lack of any convenient procedure for incorporating an effective amount of sufficiently finely-divided carbon so as to produce a high degree of opacity to ultraviolet light, while at the same time sufficiently excluding relatively large particles or agglomerates of particles so as to avoid unduly sacrificing other desirable attributes of the polymer. As applied to this problem, prior art incorporation procedures, whether accomplished during or after polymerization, have required either expensive drastic mechanical stirring or working of viscous masses, or the use of protective colloids which decompose at polymer-processing temperatures leaving undesirable bubbles or voids in the final product. Prior art procedures are exemplified in U. S. Patents 2,205,722, 2,278,878, 2,341,759, and 2,345,333.

It is an object of the present invention to provide a convenient method of preparing fluid aqueous dispersions containing colloidal carbon and a water-soluble polycarbonamide-forming substance. A further object is to provide novel fluid aqueous dispersions containing colloidal carbon and a dissolved polycarbonamide-forming substance, which dispersions are stable, in the absence of protective colloids and in the absence of mechanical agitation, against agglomeration of the colloidal carbon, both above and below polycarbonamide-forming temperatures. Another object is to provide an improved process for the preparation of compositions of synthetic linear polycarbonamide having an inherent viscosity of at least 0.4 and containing finely-divided carbon well dispersed therein. A more specific object is to provide an improved process for the preparation of weather-resistant synthetic linear polycarbonamide compositions. Other objects will be apparent hereinafter.

According to the present invention, the aforesaid objects may be achieved by a procedure wherein colloidal carbon is dispersed in the presence of an effective amount of a suitable dispersing agent in a fluid aqueous solution of a polycarbonamide-forming substance while maintaining the specific conductance of the mixture below $2.3 \times 10^{-3}$ mho/cm., the resulting dispersion is heated to polycarbonamide-forming temperatures while continuing to maintain the specific conductance below $2.3 \times 10^{-3}$ mho/cm., and the resulting mass is heated under conditions effective to drive off water and continue the polymerization, and then further heated until the polymer reaches an inherent viscosity of at least 0.4.

In one preferred embodiment of the invention, finely-divided carbon having an average ultimate particle size of less than about 65 millimicrons is preliminarily dispersed in distilled water containing from about 5 to about 10 percent, based on the weight of carbon, of the sodium salt of a naphthalene sulfonic acid/formaldehyde condensation product as a dispersing agent, to obtain a dispersion containing from about 5 to about 20 percent by weight, of carbon, substantially all of which is in the form of colloidal particles less than 200 millimicrons in size. Poymer-grade 6-caprolactam is dissolved in the preliminary dispersion to provide a fluid mass containing from about 0.5 to about 5 percent carbon by weight of the lactam, which is then heated at polycarbonamide-forming temperatures with retention of water until the bulk of the monomer is polymerized, and subsequently further heated under conditions effective to drive off water and continue the polymerization until the polymer attains an inherent viscosity of 0.9 or more. The composition obtained contains the carbon in substantially the same state of subdivision and uniformity of distribution as in the preliminary dispersion, and manifests exceptional weather resistance as compared with the unfilled polymer.

While it is possible to prepare the novel aqueous dispersions of the present invention in several ways, as for example by mixing the carbon into a suitable fluid aqueous solution of dispersing agent and polycarbonamide-forming substance and then ball-milling the mixture until the carbon particles are of colloidal size, the procedure wherein the polycarbonamide-forming substance is dissolved in a preliminarily-prepared aqueous dispersion is distinctly superior in that it eliminates the difficulty of reducing the carbon to colloidal size in a viscous medium. Accordingly, in order to prepare final aqueous dispersions containing colloidal carbon while retaining this advantage, it is important that the preliminary dispersions at the time of use contain the carbon in such form, and for optimum results, that the particles be in a superlatively fine and uniform state of subdivision.

Suitable preliminary and final aqueous dispersions are characterized as containing the carbon substantially entirely in the form of discrete particles of colloidal size, i. e., having a maximum dimension of less than about 500 millimicrons, and preferably less than about 200 millimicrons, as determined for example by microscopic examination at 2000 diameters' magnification of a sample diluted to contain about 2 percent carbon. It should be noted, however, that it is difficult to distinguish among various grades of the preferred dispersions by any direct test, and accordingly they are more conveniently described by reference to their mode of preparation, and to the solution light transmission, as hereinafter defined, of polymerized products prepared from them by a standardized version of the process of the present invention.

In preparing dispersions the water used is advantageously first distilled or otherwise deionized in order to avoid the effect of dissolved salts on the conductivity of the mixture. Commercial "easy-processing" carbon blacks having an average ultimate particle size of about 8 to about 65 millimicrons are preferred as the carbon ingredient of the dispersions. For the preparation of weather-resistant compositions, blacks having an average ultimate particle size in the range of 20 to 40 millimicrons are especially preferred.

It is essential to the preparation of suitable dispersions and to the practice of the invention that an effective amount of a suitable dispersing agent be used. In this connection, a preferred class of dispersing agents consists of the alkali-metal salts of aryl-sulfonic acid/formaldehyde condensation products, such as are commercially available under the trade names of "Daxad," "Leukanol," "Tamol," etc. However, other heat-stable, non-foaming, anionic dispersing agents effective to provide a good dispersion of carbon in water may also be used, as for example, the alkali metal salts of lignin sulfonic acid. The preferred dispersing agents are effective in concentrations of 5 percent or more, preferably 5 to 10 percent, based on the weight of carbon included.

In preparing suitable preliminary dispersions, an effective procedure involves mixing the carbon into a solution of water and dispersing agent to obtain a paste containing about 30 percent carbon by weight, and then recycling the paste through a mechanical homogenizer, diluting it with water between cycles to obtain a final product containing 5 to 20 percent carbon by weight, preferably 5 to 10 percent. Various forms of mechanical homogenizer operating on shearing or grinding principles may be used, as for example, ball mills, colloid mills, gear pumps discharging through spring-loaded valves, spinning disc homogenizers, and the like. Of these, the last two are particularly preferred inasmuch as they facilitate continuous recirculation of the mixtures during homogenization. Such treatment serves to break down agglomerates to their ultimate size, to comminute any outsize particles, and to disperse the particles uniformly. For particularly good results, the dispersions so prepared may be reprocessed through a sonic or ultrasonic homogenizer, various forms of which are commercially available. Preferably the dispersions are used very shortly after preparation, or else are thoroughly remixed just before use, so as to minimize opportunity for settling.

Polycarbonamide-forming substances which may be conveniently used in the practice of the present invention comprise in general those which dissolve in thrice their weight of water, at temperatures below about 160° C., to form fluid aqueous solutions having a specific conductance of less than $2.3 \times 10^{-3}$ mho/cm., and which are capable of being polymerized to form linear polymers having recurring units of formula

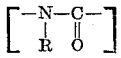

where R is hydrogen or a monovalent hydrocarbon radical, as integral parts of the main polymer chain, the average number of carbon atoms separating the amide groups being at least two, said polymers having an inherent viscosity of at least 0.4, where inherent viscosity is defined as $$\frac{ln \ N \ rel.}{C}$$

N rel. being the viscosity of a dilute (e. g. 0.5 g./100 cc.) solution of the polymer in meta-cresol divided by the viscosity of meta-cresol in the same units and at the same temperature (e. g. 25° C.) and C being the concentration of the polymer in grams per 100 cc. of solution. Substances of this type, and methods of preparing polymers from them, are disclosed in U. S. Patents 2,071,250, 2,071,253, 2,130,948, 2,163,636, and 2,241,322. A preferred group of polycarbonamide-forming substances within this class consists of the polycaproamide-forming monomers, i. e., those capable of forming polymers consisting essentially of recurring units of formula

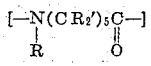

wherein R is hydrogen or a monovalent hydrocarbon radical and all the R' groups except at most one are hydrogen and the remaining R' group is hydrogen or a monovalent hydrocarbon radical. Examples of monomers within this group include 6-caprolactam, 5-aminocaproic acid, N-methyl 5-aminocaproic acid, ethyl 5-aminocaproate, 3-ethyl 5-aminocaproic acid, and the like. An especially preferred substance is 6-caprolactam, i. e., the cyclic amide of epsilon aminocaproic acid. Examples of other groups of substances within this class include low molecular weight polymers of dibasic acids and diamines, amino acids, dibasic acids and amino alcohols, and the like.

In preparing dispersions of colloidal carbon in fluid aqueous solution of polycarbonamide-forming substance by the process of the present invention, the specific conductance is maintained below $2.3 \times 10^{-3}$ mho/cm. and preferably below $1.3 \times 10^{-3}$ in order to avoid agglomeration of the colloidal particles. The specific conductance of the mixture depends largely upon the particular polycarbonamide-forming substance used, the amount of dissolved conducting impurity and the amount of water present, and accordingly measures necessary to control specific conductance at an acceptably low level involve these factors. Thus, when using polycaproamide-forming substances or low molecular weight polymers which also form fluid aqueous solutions having a specific conductance well below the prescribed limit at all concentrations, sufficiently low conductance may be maintained by avoiding the introduction of conducting impurity, or by adjusting the water content to offset the effect of such impurity. With substances which form solutions having a specific conductance which exceeds the prescribed limit at some concentrations above about 25 percent, a sufficiently low conductance may be maintained by including sufficient water and avoiding introduction of conducting impurities. Advantageously, with the latter substances, the amount of water included is not substantially more than necessary, in order to minimize the sacrifice in polymerization rate which accompanies excessive dilution.

The amount of carbon included may vary widely, but ordinarily will be such as to provide a final composition containing from about 0.5 to about 5 percent, usually about 2 percent by weight of carbon if it is desired to prepare weather-resistant compositions. Larger amounts may be included to advantage, for example, where it is desired to blend the final product with an unfilled polycarbonamide by melting the two together. In the latter instance, only a relatively small amount of mechanical working is necessary in order to obtain a thorough distribution of the finely-divided carbon throughout the melt.

Other substances may be included in the dispersions together with the polycarbonamide-forming substance to the extent that they do not cause an increase in specific conductance beyond the prescribed limit. Examples of other substances which may be thus included comprise anti-foaming agents, color stabilizers, heat stabilizers, viscosity stabilizers, catalysts, fillers, plasticizers, and the like.

In heating the resulting dispersions to polycarbonamide-forming temperatures, i. e., ordinarily above about 160° C. and preferably 200–250° C., the specific conductance is continuously maintained below $2.3 \times 10^{-3}$ mho/cm. in order to avoid agglomeration of the carbon. With the preferred dispersions containing polycarbonamide-forming substances whose aqueous solutions manifest specific conductances well below the prescribed limit at all concentrations at temperatures up to 250° C., ordinarily no particular precautions are necessary to achieve this result other than to avoid the introduction of conducting impurities. On the other hand, with dispersions having a specific conductance approximating the prescribed limit, extra water may be included to compensate for increased conductance on heating, the water being retained until the polymerization reaction has proceeded sufficiently to cause a decrease in specific conductance. Preferably, in either case, however, the heating to polycarbonamide-forming temperatures is conducted in a closed vessel with retention of water until the bulk of the polycarbonamide-forming substance has polymerized.

After the dispersion has been heated to polycarbonamide-forming temperatures, the resulting mass is further heated under conditions effective to drive off water and continue the polymerization. In the ordinary practice of the invention, the total contribution of the polycarbonamide-forming substance to specific conductance steadily decreases as the polymerization reaction proceeds, so as to at least partially offset the tendency for specific conductance to increase by reason of water removal, with the net result that the specific conductance remains below $2.3 \times 10^{-3}$ mho/cm. during this stage of operations. It is not essential, however, that specific conductance be held below this value following the heating to polycarbonamide-forming temperatures, since the tendency of the carbon particles to agglomerate is minimized by the ebullition of the mass during water removal, and by the increased viscosity of the mass after the water is removed. In general, removal of the bulk of the water is effected by venting it as steam from the reaction vessel while maintaining the mass under a pressure in the range of 180 to 300 p. s. i. g. in order to continue polymerization at temperatures of 180 to 300° C.

Following removal of the water the mass is further heated until the polymer reaches an inherent viscosity of at least 0.4 and preferably 0.9 or more for the production of weather-resistant compositions.

The compositions so produced contain carbon uniformly dispersed in very finely-divided form and are substantially free of relatively large particles and agglomerates of particles as compared to corresponding carbon-filled compositions obtained by prior art techniques not involving the use of protective colloids or the use of drastic mechanical stirring. The distinction may be shown by comparing microphotographs of films, or light transmission of solutions of such compositions, or by comparing their behavior on being extruded in molten form through fine filters. In the latter instance, compositions produced by the process of the present invention are readily extruded under conditions where the compositions produced by the prior art techniques above adverted to blind the filters so as to seriously interfere with filtration.

The products obtained are glossy black, and free from dull spots, "burn marks" or smears frequently found in compositions containing less thoroughly dispersed carbon. The products are extruded without difficulty through fine filters having openings of about 0.01 inch or less to obtain compositions having outstanding weather resistance. In many instances compositions having good weather resistance are obtained directly from the polymerziation. In all instances, however, both the degree of opacity of the compositions to ultraviolet light, as evidenced by solution light transmission, and the weather resistance, appear to be improved by the mechanical working incident to filtration, and accordingly in preferred embodiments, the process of the present invention involves a filtration step. The filtration may be accomplished as an incident of discharging the product from the polymerization vessel or at later times when the composition is melted before being fabricated. A convenient means of effecting the filtration satisfactorily consists in forcing the molten product through a screen pack containing four screens having a standard mesh of 100, 120, 120 and 100 respectively. Various other means which might be used will be apparent to those skilled in the art.

The invention is further illustrated by means of the following examples, which however, are not intended to limit its scope. In the examples all parts are by weight unless otherwise noted.

*Example 1.*—A preliminary dispersion of colloidal carbon was prepared by mixing 2 parts of carbon black, 20 parts of distilled water, and 0.2 part of dispersing agent in a Waring blender for about 15 minutes. The carbon was commercial "easy-processing" channel black having an average ultimate particle size of about 35 millimicrons. The dispersing agent was "Daxad" No. 11, a product of the Dewey and Almy Chemical Co., described as the sodium salt of a naphthalene-sulfonic acid/formaldehyde condensation product. Microscopic examination of the dispersions at 970 diameters showed the particles to be substantially all smaller than about 500 millimicrons. Addition of 78 parts of aqueous solution containing 0.5 part of polyhexamethylene diammonium adipate gave a mixture having a specific conductance of slightly above $2.3 \times 10^{-3}$ mho/cm. and caused extensive agglomeration of the carbon particles. In contrast addition of 78 parts of aqueous solution containing 27 parts of 6-caprolactam to a similar dispersion gave a mixture having a specific conductance of about $0.2 \times 10^{-4}$ mho/cm. in which the carbon particles were not agglomerated. Similarly addition of 78 parts of aqueous solution containing 27 parts of 5-amino caproic acid gave a mixture having a specific conductance of about $1.3 \times 10^{-3}$ mho/cm. in which the carbon particles were not agglomerated. The latter two dispersions were boiled in open vessels for about 20 minutes to give apparently homogeneous masses, which on microscopic examination at 970 diameters showed no evidence of agglomeration of the carbon.

*Example 2.*—A preliminary dispersion similar to that of Example 1, containing 2 parts of carbon black, 98 parts of water and 0.2 part of dispersing agent was combined with 100 parts of 6-caprolactam and mixed to obtain an apparently homogeneous dispersion. Samples of the mixture were sealed in glass tubes. One such tube was heated at 165° C. for 5 hours. Microscopic examination of the resulting material at 970 diameters revealed no evidence of agglomeration of the carbon particles. Another such tube was placed in a metal pressure vessel together with a quantity of liquid to equalize the pressure within and without the sealed tube. The vessel was then heated to 258° C. for one hour. After this treatment the tube was cooled and a black sludge was removed. On warming this material to about 100° C., a thin liquid was obtained which on examination at 970° C. was observed to contain particles of polymer 5 to 10 microns in size, but no agglomerated carbon.

*Example 3.*—A dispersion as described in Example 1, containing 4 parts of carbon black, 196 parts of water, and 0.2 part of dispersing agent, was charged to an unstirred pressure vessel together with 200 parts of 6-caprolactam. The charge was blanketed with nitrogen and heated to 110° C. during 100 minutes, removing 150 parts of water in the process. The vent line from the vessel was then closed, and heating was continued during 125 minutes until the temperature of the charge reached 242° C. and the pressure 255 p. s. i. g. The specific conductivity of the charge remained below $1.30 \times 10^{-3}$ mho/cm. during the entire period from commencement of heating until the temperature reached 242° C. The charge was further heated during 130 minutes while the pressure was gradually reduced to 10 mm. Hg absolute, and an additional 30 minutes at that pressure, the temperature being maintained at 240–270° C. The specific conductivity decreased steadily to a very low value during these pressure-reduction and finishing steps. The charge was then allowed to cool, the vacuum was broken with nitrogen, and the contents of the vessel were removed. The product was a black uniform appearing composition containing about 2 percent carbon and having an inherent viscosity of 1.03. A sample of the product was chilled, chopped in a cutter, and dried to form a molding powder which was compression molded to a thin film. Microscopic examination of the film indicated no agglomeration of the carbon particle had occurred. The percentage of light transmitted through a similar film of product 1 mil thick was determined relative to methanol using a Cary Recording Spectrometer at wave lengths of 2250–8000 A. The values obtained ranged from about 0.1 percent below 4000 A and increased steadily above 4000 A to about 1.2 percent at 8000 A. Filaments prepared by extruding a sample of the molding powder showed excellent weather resistance, retaining elongation more than twice as long as unfilled filaments on exposure to artificial sunlight.

*Example 4.*—A preliminary dispersion was prepared using the ingredients of Example 1 by stirring the carbon into water containing the dispersing agent to form a paste containing about 25 percent carbon, passing the paste through a colloid mill at 20 mil clearance, diluting with water, repassing through the colloid mill at 2 mil clearance, again diluting and processing through the colloid mill at 1 mil clearance. This product was further diluted and fed through a sonic homogenizer operating on a cavitation principle and having a diaphragm oscillating at high intensity at about 360 cycles per second. The resulting product contained 115 parts water, 1 part of dispersing agent, and 10 parts of dispersed carbon substantially all of which was in the form of particles smaller than 200 millimicrons.

The preliminary dispersion was charged to an unstirred autoclave together with 95 parts of distilled water and 490 parts of 6-caprolactam, and the charge was blanketed with nitrogen, and heated with retention of water during 105 minutes to 240° C. and 250 p. s. i. g., vented at 250 p. s. i. g. during 50 minutes, taken gradually to a pressure of 80 mm./Hg during 110 minutes, and held at that pressure for 30 minutes, the temperature being maintained at 240–270° C. during these latter steps. The vacuum was then broken with nitrogen and the product was allowed to cool and removed from the autoclave. The product was a uniform black material having an inherent viscosity of 1.03. A one mil thick film prepared from the product showed negligible light transmission below 4000 A in the test of Example 3 and a maximum of 0.65 percent at 8000 A. A further measure of the degree of dispersion and degree of opacity to light in terms of solution light transmission was obtained by the following procedure. One gram of product was shaken with 50 ml. of 85 percent phenol to dissolve the polymer. Shaking was continued during 4 hours, plus or minus 15 minutes. A one ml. aliquot was then diluted to 50 ml. with additional 85 percent phenol, shaken for one minute, and the amount of light transmitted through a sample of the diluted material in a 5 cm. cell was determined, using a Beckmann Spectrophotometer at a wave length of 5780–5790 Angstrom units. This wave length was found to be that at which the maximum transmittance in both ultraviolet and visible ranges was obtained on representative carbon-filled polycarbonamides. The value so obtained was compared with that of the 85 percent phenol to give the percentage of light transmitted. The standard deviation of the method was 0.6 percent. By this test a value of 2.0 percent was obtained for this product.

A further sample of molding powder prepared from the product was melted and forced through a screen pack consisting of four screens, in series, having a standard mesh of 100, 120, 120, and 100 respectively. The screening was accomplished without difficulty and the screened product manifested a solution light transmission, as defined above, of 1.6 percent. A part of the screened product was extruded in the form of 30 mil diameter filament and subjected to artificial weathering under standardized conditions which included continuous exposure to artificial sunlight having an increased intensity in the ultraviolet range, and periodic drenching with water. Under these conditions the filaments withstood over 2,500 hours without failure, the point of failure being defined arbitrarily as that at which the samples lost more than 60 percent of their original ability to be elongated. Corresponding unfilled filaments failed this test in less than 600 hours. Test bars molded from the screened product manifested excellent physical properties as compared to corresponding unfilled products via standard ASTM tests.

*Example 5.*—The procedure of Example 4 was duplicated except that enough carbon black was included to give a final composition containing about 10 percent carbon by weight. The inherent viscosity of the polymer was 0.84. One part of the finely chopped product was mixed with four parts of finely cut polyhexamethylene adipamide having an inherent viscosity of about 1.2. The mixture was dried in a vacuum oven and plasticized by screw-extruding at 260° C. The extrudate was cut, dried, and re-extruded at 260° C. through the screen pack of Example 4 to produce a 30 mil diameter monofilament. The inherent viscosity of the polymer of the final product was 1.0. Samples of this monofilament tested under the artificial weathering of Example 4 likewise withstood over 2500 hours without failure.

The carbon-filled polycarbonamides produced by the process of the present invention may be employed in a wide variety of applications, and are particularly useful wherever their black color or increased weather resistance is desirable. For example, they may be used in filament form to make improved brush bristles, fishing nets, auto seat covers, window screens, etc. As fibers, they may be used to make durable black knitted goods, fabrics, cords, etc. They may be used to form improved protective coatings for fabrics, wire, wood, paper, etc. In the form of molding powder they may be compression molded or injection molded or extruded to form a wide variety of useful articles in which increased weather-resistance is desirable, as for example, components or agricultural machinery, such as gears, sprockets, cams, bearings, seeding plates, levers, spray nozzles, agitators, hose couplings, mower parts, etc.; automotive parts, such as signal light housings, radiator caps, gasoline tank caps, tire valve caps, hub caps, gear shift knobs, brake air and hydraulic line connectors, license plate brackets, spot-lamp housings, name plates, instrument panels, radio antenna bushings, etc.; electrical parts, such as switch plates, instrument covers, light shields, low-voltage terminal boxes, control handles and knobs, radio and television antenna fittings, door bell plates, etc.; marine hardware, such as blower housings, switch covers, ventilators and ventilator hoods, clutch controls, spark and throttle controls, wire clips, oarlock sockets, pole sockets, light housings, buoys, anchor chocks, port light frames, window channels, pulleys, drain plugs, sheaves, etc.; sporting goods accessories such as golf bag handles, trim and bottoms, bicycle seats, fishing reels, checks and plates for guns, battery cases, tool boxes, etc.; parts for toys, such as handle bar grips, pedal blocks, bell and horn parts, decorative moldings, etc.; and many others.

It will be apparent from the above description and examples that the process of the present invention provides a convenient process for the production of highly useful weather-resistant carbon-filled polycarbonamide compositions, in which it is unnecessary to resort to expensive mechanical stirring or working or the use of protective colloids in order to achieve the necessary superlative degree of subdivision and uniformity of distribution of the carbon particles throughout the polymers.

A further advantage of the process is that the compositions produced are readily extruded through fine filters, inasmuch as such filtration is customarily carried out in fabrication in order to guard against foreign particles which might damage fabrication equipment and in order to facilitate obtaining void-free final articles. A further advantage of the process is that it may be practiced in conventional polymerization equipment. Various other advantages will be apparent to those skilled in the art.

I claim:

1. A process for preparing polycaproamide compositions containing 0.5 to 5 weight percent of well-dispersed finely divided carbon which comprises: dispersing a disperse phase, consisting essentially of colloidal carbon having a discrete particle size of less than 500 millimicrons in a fluid continuous phase consisting essentially of (1) water, comprising 10 to 50 weight percent of said continuous phase (2) polycaproamide-forming monomer selected from the group consisting of compounds of general formula

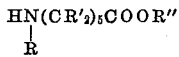

wherein R, R' and R'' are selected from the group consisting of hydrogen and monovalent hydrocarbon of 1 to 6 carbon atoms, and each R' except at most one is hydrogen, and lactams of said compounds, and (3) at least 5 percent, based on the weight of said carbon, of a dispersing agent selected from the group consisting of the aryl sulfonic acid/formaldehyde condensation products and the alkali metal salts of lignin sulfonic acid, to obtain a fluid dispersion, having a specific conductance of less than $2.3 \times 10^{-3}$ mho/cm. and consisting essentially of said carbon, water, monomer and dispersing agent; and heating said dispersion at a temperature of 160 to 300° C. with removal of volatiles until polycaproamide having an inherent viscosity in the range of 0.4 to 2 is obtained.

2. A process for preparing polycaproamide composition containing 0.5 to 5 weight percent of well-dispersed finely divided carbon which comprises: dispersing a disperse phase consisting essentially of colloidal carbon having a discrete particle size of less than 200 millimicrons in a fluid continuous phase consisting essentially of (1) water, comprising 10 to 50 weight percent of said continuous phase (2) 6-caprolactam and (3) 5 to 10 percent, based on the weight of the carbon, of the sodium salt of a naphthalene sulfonic acid/formaldehyde condensation product as a dispersing agent, to obtain a fluid dispersion, having a specific conductance of less than $2.3 \times 10^{-3}$ mho/cm. and consisting essentially of said carbon, water, monomer and dispersing agent, and heating said dispersion at a temperature of 160 to 300° C. with removal of volatiles until polycaproamide having an inherent viscosity of 0.4 to 2 is obtained.

References Cited in the file of this patent
UNITED STATES PATENTS

| | | |
|---|---|---|
| 2,163,636 | Spanagel | June 27, 1939 |
| 2,205,722 | Graves | June 25, 1940 |
| 2,341,759 | Catlin | Feb. 15, 1944 |
| 2,689,839 | Heckert | Sept. 21, 1954 |